United States Patent Office 3,504,528
Patented Apr. 7, 1970

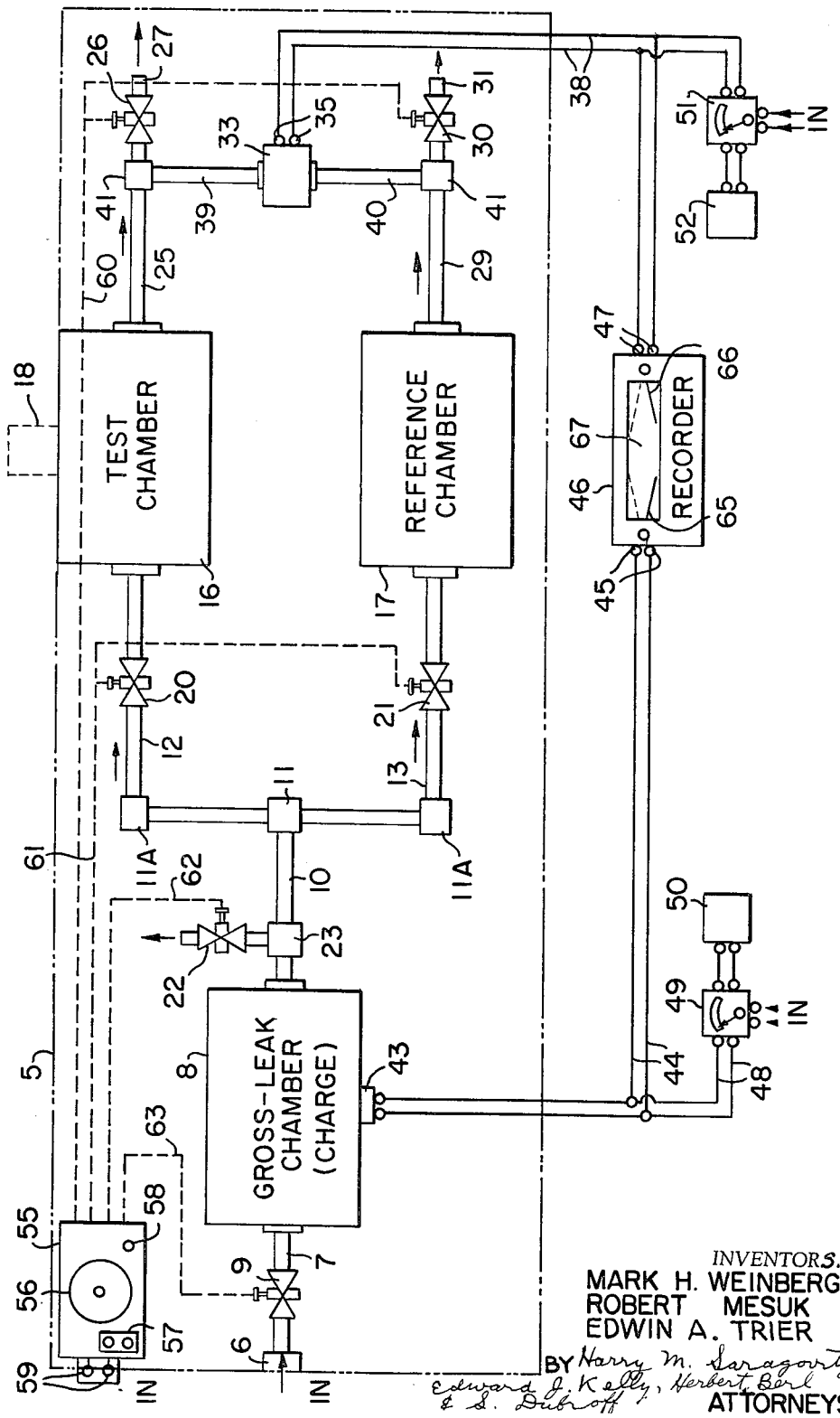

3,504,528
FLUID PRESSURE LEAK DETECTOR SYSTEM FOR CLOSED CONTAINERS AND THE LIKE
Mark H. Weinberg, Short Hills, Robert Mesuk, Wayne, and Edwin A. Trier, Westbury, N.Y., assignors to the United States of America as represented by the Secretary of the Army
Filed Apr. 9, 1968, Ser. No. 719,997
Int. Cl. G01m 3/32
U.S. Cl. 73—49.3
7 Claims

ABSTRACT OF THE DISCLOSURE

For detecting and measuring leaks and breaks in sealed or sealable containers and the like, air or other gas at low pressure is introduced into a first chamber to charge it full after which it is sealed off at the inlet end. Then the charge in the chamber is permitted to flow out into two further chambers, one designated as a test chamber and the other as a reference chamber and each being of substantially the same volume. The device or item to be pressure tested for leaks is inclosed in the test chamber before the test operations begin. An outlet conduit from each of the test and reference chambers are connected to a differential pressure sensor device preferably of the variable capacitance or resistance type. This varies an output voltage in response to a difference in pressure between the two chambers which varies in magnitude substantially directly in proportion to the differential pressure. The system pressure measured in the input or first chamber falls to an initial lower level as the other two chambers are filled therefrom and should remain stabilized at that level. If it drops below this level immediately, it indicates a leak in the test item of relatively large volume. If no large volume leak is indicated, the test and reference chambers are then cut off substantially simultaneously from the charge chamber. A satisfactory seal in the test device or item will operate to maintain the differential sensor balanced with equal pressure and the output will give a zero deflection on an electrical or indicating measuring instrument connected therewith. If the differential pressure sensor device is increasingly unbalanced, the indicating instrument will indicate the corresponding differential pressure change per unit of time or the leak rate over a predetermined cycle of operation.

---

The invention described herein may be manufactured, used, and licensed by or for the Government for governmental purposes without payment to us of any royalty thereon.

The present invention relates to testing equipment for determining the efficiency of the seal or the ability to hold a charge of sealed item, such as a container of the metal can type, or other military devices such as projectiles and mortar shells, for example, which are sealed at one end. The system of the present invention utilizes volume sharing and differential pressure sensing as a function of time in its operation.

It is an object of this invention to provide a leak detector for sealed containers and the like which is adapted to detect all types of leaks therein from large to small or from gross to fine, and which provides for testing a wide variety of items of this type.

Heretofore, in the area of complete spectrum leak testing, known types of leak test equipment have included many shortcomings. For example, many commercial leak detectors with extreme sensitivity, break down when a gross leak is present. This is due either to equipment contamination or lack of response at high peak levels. Other types of equipment or test set ups work well with large leaks but have no sensitivity at the lower level.

Present commercial equipment of this type furthermore often requires a special or costly tracer gas to be used as in helium mass spectrometry or halogen leak testing. In commercial equipment the test items are often subjected to special or damaging environment as in submergence-bubble testing.

In accordance with the present invention, for gross leak measurement, an inlet or supply chamber is charged or pressurized to a predetermined system pressure and releases some of its charge to the test system. A drop in pressure is monitored on a suitable readout element. An unsealed test item or one with a large void in its seal will cause a greater pressure drop than is established during calibration with a known sealed item.

For detecting fine leak openings, porosity, thin cracks and small voids in the container walls of the test or items, for example, the test chamber provided is isolated from its comparison or reference chamber. The reference chamber will then maintain its initial pressure but the test chamber will do this only if test units or items therein have adequate hermetic seals so that no leakage path therethrough is provided.

A fine leak will cause a pressure drop per unit of time in the test chamber. This is in accordance with one of the principles of operation of the device, which also provides that a gross leak in a closed-end item will show up immediately in the charge or input chamber pressure drop, as above referred to.

Further in accordance with the invention, an extremely sensitive differential sensor of the electro-mechanical type preferably is used to monitor reference and test chamber pressures. In any case the read out from the system is monitored for zero pressure differential per test cycle time, and this can be any desired interval of time. If desired, a quantitative leak rate may be assigned to the results, using calibrated standards with known leak rates at a given applied pressure.

To record the leak rate during a test cycle, a dual-channel recorder may be employed for read-out. One channel records pressure drop readings from a gross leak chamber transducer and the second channel records differential pressure drop per unit of time which is converted to leak rate.

The invention will further be understood from the following description when considered with reference to the accompanying drawing, and its scope is pointed out in the appended claims.

In the drawing, the single figure is a schematic representation of a differential-pressure leak detector or detector system constructed in accordance with the invention, and referring thereto it will be seen that this detector system is an equipment unit which may be entirely self contained as indicated by the dash-and-dot outlined enclosure 5 therefore. Air or other gas under pressure is admitted to the system or equipment unit through a gas or air pressure inlet element 6 which is connected through an inlet conduit or pipe 7 with an inlet or supply chamber 8 having a relatively large volume for charging or pressurizing to a predetermined system pressure. An inlet valve 9 is provided in the conduit 7 for closing off the air or gas supply as will hereinafter be described. A high-pressure, dry, nitrogen bottle-gas supply may be used and is reduced down to the system pressure which is substantially normally about five pounds per square inch. Likewise, compressed air may also be used as a source of supply with adequate filtering before application at the inlet element 6.

The chamber 8 is provided with an outlet conduit 10 having a branch connector 11 leading to branch lines or arms 12 and 13 which are connected respectively with a test chamber 16 and a reference chamber 17 of substantially equal volume. The test chamber is sufficiently large to receive one or more of the desired test item such as the one indicated in dotted outline at 18. This may be any sealable or closed container such as mortar shell for example. A cutoff valve 20 is provided in the branch line 12 and a similar cutoff valve 21 is provided in the branch line 13. Also, an outlet valve 22 is provided in connection with the outlet conduit 10 through a coupling unit 23 therein. This valve and the inlet valve 9 are normally closed and the valves 20 and 21 are normally open.

Leading from the test chamber 16 is an outlet conduit 25 which is provided with a closed exhaust valve 26 having an outlet end 27 exhausting freely into the atmosphere. This valve is normally closed. Likewise an outlet conduit 29 is provided in connection with the reference chamber 17 and is provided with an exhaust valve 30 having an outlet end 31 exhausting in the atmosphere. This valve is also normally closed.

The conduits 25 and 29 are substantially in extension of the lines 12 and 13 and are coupled directly into differential sensor device 33 of the electro-mechanical type for receiving pressure from both the test chamber and the reference chamber in balanced relation and to generate an output voltage depending upon a variation in the pressure on one side of the other of a differential sensing device therein. Such devices are well known and need not be described further except to indicate that the generated output voltage resulting from a differential pressure is received at the output terminals indicated at 35. The terminals 35 are connected to indicating output lines 38.

The input conduit connections for the differential sensor 33 with the lines 25 and 29 are indicated respectively at 39 and 40 and coupled into the lines to suitable coupling units or like elements 41 as indicated. This provides a free flow of gaseous pressure or air pressure from the test chamber 16 and from the reference chamber 17 directly into the sensing device 33, so that any slight variations in pressure difference may be sensed thereby and translated into a suitable electrical output voltage.

The pressure in the gross-leak or charge chamber 8 is likewise monitored through a suitable electro-mechanical pressure transducer indicated at 43 and having output leads 44 connected with one set of input terminals 45 of a dual-channel indicator or recorder 46, while the opposite channel input terminals 47 are connected with the leads 38, as indicated. From the leads 44 a branch circuit connection 48 is provided for relay meter device 49 which supplies current to a suitable alarm device 50. Also a similar relay meter 51 is provided in connection with the leads 38 and operates to control an alarm device 52 with which it is connected. As indicated, the indicator or recorder and relay meters are external to the equipment enclosure 5. Both the sensing devices 43 and 33 may be of the piezo-electric type.

The valves 9, 20 and 21, together with the release valves 22, 26 and 30, are controlled in a predetermined sequence, or order for operation of testing equipment. Some may be operated simultaneously as are the valves 20 and 21, and the valves 22, 26 and 30, as will hereinafter be described. The valve 9 opens and closes independently of the other valves. The opening and closing of the valves may be controlled by any suitable means, or manually, as desired but preferably in accordance with the operation of a timing device, as indicated at 55, having a timing dial 56 and operating button control 57 and an adjustable control element 58. Input electrical supply terminals 59 are provided on the equipment enclosure for supplying operating current to the timing device 55.

The valves 26 and 30 are connected together and to the timing device 55, as indicated by the dash line 60. The valves 20 and 21 likewise are connected together and to the timing device 55, as indicated by the dash line 61. The valve 22 and the valve 9 are connected with the timing device 55 through suitable connections indicated by the dash lines 62 and 63, respectively. Any suitable means may be provided for operating the valves in unison and in a timed sequence, as will hereinafter be described.

The system pressure in the present example may be considered to be 5 pounds per square inch, and the sensitivity of the system to a fine leak is substantially $1 \times 10^{-4}$ cc./sec. The cycle time may be any desired time interval and in the present example may be considered to be substantially 30 seconds. The differential sensor 33 may be of a type known commercially as a Decker Co. Model No. 306B-2G type. The cycling timer 55 may be a single cycle, multiple-cam timer. The valves are preferably of the solenoid or pneumatic-operated type for effective control.

The sequence of operation of the equipment is as follows: Test item or device or a plurality of test items or devices 18 are placed in the test chamber 16 and secured therein against external leakage. Current is applied to the input terminals 59 and operating gaseous or air pressure is applied to the input connection 6. All of the valves are closed at the beginning of the cycle. The valve 9 is then caused to open, thereby admitting initial system pressure ($P_1$) to the gross-leak or charge chamber 8. When the chamber has filled, the valve 9 closes, cutting off the supply and providing for a measured quantity of gas or air in the chamber and its connections.

The valves 20 and 21 are then opened, admitting pressure to the test and reference chambers 16 and 17. The system pressure drops to a pressure ($P_2$) which is indicated on the channel 1 at the terminals 45 of the recorder 46 and the relay meter 49. If the indications on readout at the recorder and at the relay are well below the lowered system pressure ($P_2$), gross leak is indicated in the test device or devices in the test chamber. The meter relay 49 will operate the alarm device 50 and the movement of the indicator element 65 of the recorder 46 will likewise show a full scale deflection on the moving tape or recording element 67 therein.

The valves 20 and 21 are now closed simultaneously, isolating the test chamber 16 from the reference chamber 17 and from the gross-leak or charge chamber 8 and its connections. A satisfactory condition in the test item 18 will now keep the sensor 33 balanced with equal pressure and the readout at the relay 51 and at the recorder 46 will give zero indication or deflection throughout the cycle time. A fine, minute, leak in the test item 18 will cause a pressure drop per unit time in the test chamber 16. The sensor 33 then becomes unbalanced and the readout at the recorder 46 will indicate a differential pressure change per unit of time or the leak rate. Likewise, if this rate is sufficiently high, the relay 51 will actuate the alarm device 52.

When the test portion of the cycle is completed, the vent valves 22, 26, and 30 are opened simultaneously and the chambers 16, 17 and 8 and the lines 12 and 13 are vented, after which the valves 22, 26 and 30 are again closed. The system is then ready for a repeat test operation with a new test item or items.

From the foregoing description it will be seen that the present equipment is adapted to operate automatically as by a push-button starter 57 which will allow the operation or test cycle to go through from start to completion. The valves and equipment may be operated manually if desired.

A wide variety of items may be tested with this system. Projectile bodies are sealed at one end only, and may be included in the category of containers. In testing such items, the test equipment may provide a seal for the open end of the item. Thus the principle of operation is not changed. The chamber volume, the holding fixtures required for certain test items, the system pressure, cycle time and use of transducers are all easily changed for any particular application. This system is used presently for testing 60 mm and 81 mm. mortar projectile casings or bodies for leakage. The equipment is adapted to detect all types of leaks from gross to fine for these particular ordnance applications and for these, a leakage rate as low as $1 \times 10^{-4}$ cc./sec. has been measured.

The system of the present invention utilizes volume sharing, and differential pressure sensing as a function of time. For gross leak measurement the drop in pressure in the inlet or charge chamber is measured or detected by the device 43 and the equipment connected therewith. An unsealed test item or one with a large void in its seal will thus cause a greater pressure drop than normal and will be immediately indicated by operation of the alarm device 50.

For detecting fine leaks and the small voids or porosity in test equipment, the test chamber is isolated from the reference chamber which maintains its initial pressure to be compared with the pressure as it falls in the test chamber, should there be a slight or continuing leakage over the test cycle. Thus a fine leak will cause a pressure drop per unit time in the test chamber and will be recorded and indicated by the connected equipment as described.

Furthermore it will be seen that no special or costly gas is required for the operation of the system and the test item is not subjected to any special or damaging environment, as in the submergence test hereinbefore mentioned. The cycle time may be made relatively short and plurality of devices may be tested at one time, depending upon the size of the test chamber. The equipment operation and readout is substantially simplified and requires no special training for its operation. The equipment is also self contained and is readily adapted for timer operation because of the relatively few number of valves concerned and multiple operation thereof in the two branches.

The system, as shown and described, has eelctro-mechanical controls and output indicating means. The system is not limited to the exclusive use of such controls and output means, but may use other controls and means for the purposes without changing the basic operation thereof.

We claim:

1. A fluid-pressure leak detector system for closed and the like containers comprising in combination, fluid pressure inlet means including an inlet valve, a supply chamber providing a predetermined quantity of fluid connected with said inlet means, a first pressure-sensing means connected with said chamber for deriving an indication of the pressure in said chamber, means providing test and reference chambers of similar volume and configuration, an outlet conduit for said supply chamber having branch connections with said test and reference chambers, a normally-closed control valve in each branch connection, an outlet conduit for each of said test and reference chambers, a normally-closed outlet valve for each of said outlet conduits for releasing pressure in said test and reference chambers, differential pressure-sensing means coupled to said last-named outlet conduits for response to unbalanced pressures therefrom and to indicate relative pressure changes in the said chambers, and means connected for operating said valves in predetermined sequence to provide differential pressures in response to the application of test pressure to a defective test device in said test chamber and an indication thereof through said pressure-sensing means.

2. A fluid-pressure leak detector system as defined in claim 1, wherein the pressure-sensing means includes two electro-mechanical piezo-electric devices and connected electrical indicating devices therefor calibrated to provide pressure indication, and wherein the valve operating sequence is such that the supply chamber is charged through said inlet valve and the test and reference chambers are charged from said supply chamber through said control valves and cut off by closure of said control valves for final differential pressure indication between said test and reference chambers.

3. A fluid-pressure leak detector system as defined in claim 1, wherein said means for operating said valves in sequence includes a time-controlled operating means and wherein the branch control valves are connected to open and close together and the outlet valves are similarly connected to operate simultaneously in the same direction to close and open together.

4. A fluid-pressure leak detector system for closed and the like containers comprising in combination, fluid pressure inlet means including an inlet valve, a supply chamber providing a predetermined quantity of fluid connected with said inlet means, a first electro-mechanical pressure-sensing device for deriving an electrical indication of the pressure in said chamber, means providing a test chamber, means providing a reference chamber, an outlet conduit for said supply chamber having branch connections with said test and reference chambers, a normally-closed control valve in each branch connection, a normally-closed outlet valve connected with said supply chamber for releasing the pressure therein, a pair of outlet conduits for said test and reference chambers, a normally-closed outlet valve for each of said outlet conduits for releasing pressure in said test and reference chambers, an electro-mechanical differential-pressure sensing device coupled to said last-named outlet conduits for response to unbalanced pressures in said test and reference chambers, and a dual-channel electro-mechanical recorder device connected with said pressure-sensing devices thereby to indicate and record relative pressure changes in the said chambers, and said valves being connected to operate in predetermined sequence to charge said supply chamber and said test and reference chambers therefrom and to isolate said test and reference chambers through operation of said control valves, thereby to provide differential pressures in response to the application of test pressure to a defective test device in said test chamber and an indication thereof through said recorder device from said pressure-sensing devices.

5. The fluid-pressure leak detector system as defined in claim 4, wherein a time-controlled operating means is connected to operate said valves in said sequence and wherein the branch control valves are connected to open and close together and the outlet valves are similarly connected to operate simultaneously in the same direction to close and open together.

6. A fluid-pressure leak detector system comprising in combination, a normally-closed inlet valve, a fluid-pressure supply chamber connected for receiving a predetermined quantity of pressurizing fluid under control of said valve, electro-mechanical pressure-sensing means connected with said chamber for deriving an electrical current output in response to changes in fluid pressure therein, means providing separate test and reference chambers, an outlet conduit for said supply chamber having a pair of parallel-related branch conduit input connections with said test and reference chambers, a normally closed control value in each of said branch conduit connections, a normally closed outlet valve connected with the outlet conduit for said supply chamber, an outlet conduit for each of the test and reference chambers, a normally-closed pressure outlet valve connected with each of said outlet conduits, a differential electro-mechanical fluid pressure sensing device coupled with and between said pair of outlet conduits and having an electrical output circuit connected for deriving an electrical current output resulting from a pressure differential between said conduits, a dual-channel electro-mechanical recorder device connected with said output circuit and with said first-named pressure-sensing means, thereby to respond to current changes and indicate pressure changes in the said chambers and directly a gross leak from the supply chamber to the test chamber, and time-controlled means for operating said valves in predetermined sequence to effect a test-operation for leakage in said test chamber.

7. A fluid-pressure leak detector system comprising in combination, means providing a fluid pressure inlet connection for the system including a normally-closed inlet valve, means providing an inlet supply chamber connected with said inlet means for receiving a predetermined quantity of pressurizing fluid therefrom under control of said valve, electro-mechanical pressure-sensing means connected with said chamber for deriving a pressure indication in response to changes in fluid pressure therein, means providing separate and substantially like test and reference chambers, an outlet conduit for said supply chamber having a pair of parallel-related branch conduit input connections with said test and reference chambers, a normally-closed control valve in each of said branch conduit connections for isolating said test and reference chambers from the supply chamber and each other, a normally closed outlet valve connected with the outlet conduit for said supply chamber, a pair of outlet conduits for the test and reference chambers extending therefrom in parallel relation and effectively in continuation of the input connections therefor, a normally-closed pressure outlet valve connected with each of said outlet conduits, a differential electro-mechanical fluid pressure sensing device coupled with and between said pair of outlet conduits and having an output circuit connected for deriving an output signal resulting from a pressure differential between said conduits, and current-responsive pressure indicating means connected with said output circuit and with said first-named pressure-sensing means, thereby to indicate changes in the pressures in the said chambers and directly a gross leak from the supply chamber to the test chamber, and means for operating said valves in predetermined sequence, to charge said supply chamber and said test and reference chambers therefrom and thereby apply fluid test pressure to a test device in said test chamber, and to isolate said test and reference chambers and effect a differential pressure indication in said indicator means in response to the application of said test pressure to a defective test device in said test chamber.

References Cited

UNITED STATES PATENTS

| | | |
|---|---|---|
| 2,116,636 | 5/1938 | Neumann. |
| 2,872,806 | 2/1959 | Namzic _____ 73—40 |
| 2,924,965 | 2/1960 | Westerheim _____ 73—40 |
| 3,039,295 | 6/1962 | LeMat et al. _____ 73—49.2 |
| 3,326,034 | 6/1967 | Fitzpatrick et al. _____ 73—40 |
| 3,331,237 | 7/1967 | Strang _____ 73—40 |
| 3,355,932 | 12/1967 | Mulligan _____ 73—49.3 |

FOREIGN PATENTS 665,391  6/1963  Canada.

LOUIS R. PRINCE, Primary Examiner

H. C. POST III, Assistant Examiner